Patented Dec. 14, 1948

2,456,549

UNITED STATES PATENT OFFICE

2,456,549

PREPARATION OF CARBOXYLIC ACIDS BY THE OXIDATION OF ALDEHYDES

Charles Weizmann, London, England, assignor to Polymerisable Products Limited, London County, England, a British company No Drawing. Application January 29, 1947, Serial No. 725,147. In Great Britain April 18, 1941

Section 1, Public Law 690, August 8, 1946
Patent expires April 18, 1961

11 Claims. (Cl. 260—530)

The present invention relates to the oxidation of aldehydes to the corresponding acids, especially of saturated aliphatic aldehydes to fatty acids according to the equation $$2R.CHO + O_2 = 2R.COOH$$

It is known that this reaction can be carried out by means of air or mixtures of air with oxygen or oxygen-containing gases in the presence of small amounts of catalysts suspended or dissolved in the aldehydes. Amongst such catalysts used were the saturated or unsaturated fatty acid salts of metals of variable valency such as manganese butyrate.

The present invention is concerned with the use of new and improved catalysts for carrying out this oxidation. According to this invention, the catalysts employed consist of double compounds or mechanical mixtures of a plurality of salts of unsaturated fatty acids such as oleic acid with multivalent metals such as lead, manganese and others.

Whilst lead is an invariable component of the mixture, the other metals can be selected from the manganese and the cobalt groups of the Periodic System.

The metals mentioned above are known to each exist (in compounds) in a plurality of different valencies. Thus manganese may have a valence of 2, 4, 6 and 7, in its different well known compounds. Such metals will hereinafter be referred to as "multivalent metals" for brevity.

These salts may be obtained according to known methods such as precipation of the sodium salts of the unsaturated fatty acids with soluble salts of the multivalent metals or the neutralisation of the unsaturated fatty acids with metal oxides, hydroxides or carbonates. For the purpose of the present invention it is preferred to prepare the catalysts by heating the mixture of the anhydrous metal carbonates with the calculated quantity of unsaturated fatty acid or fatty acids necessary for complete neutralisation, during some hours at a temperature of about 120 to 130° C. The catalyst is advantageously applied by heating it gently with a small volume of the aldehyde, whereby a very fine, stable and reactive suspension is obtained. A convenient proportion of ctatlyst is about 0.5 to 2% by weight of the aldehyde.

The oxidation in the presence of the catalyst may be effected by air which is passed through the pure liquid aldehyde, carrying the stated amount of the catalyst. In some cases it may be of advantage to use a current of air which had been enriched in oxygen up to 40 or 50%. No external heating is required for the reaction, the temperature of the mixture rising spontaneously by the exothermic oxidation reaction. Thus the rapid progress of the reaction, being measurable of course by titration of acidity or by the increase of weight—provided there is no loss of aldehyde by evaporation—can be best observed by observation of the temperature rise in the reacting liquid. As no solvents, no heating and no pressure are required the process is very cheap and economical.

The yield in pure fatty acid may be quantitative. The speed of the oxidation depends on and can be regulated by the speed with which the oxygen-containing gas is introduced, and on the intimacy of contact between the gaseous and the liquid phases. The quick introduction of a finely divided air stream and a turbulent mixing of the air and the liquid which holds the catalyst in suspension, by efficient stirring reduce the duration of the reaction to some hours. The reaction being considerably exothermic, care must be taken that the temperature does not reach the boiling point of the aldehyde. By submitting relatively low boiling and volatile aldehydes, say for instance butyric aldehyde of B. P. 75° C., to the oxidation some aldehyde may be carried away with the current of spent air. A loss of aldehyde is prevented by a very efficient reflux condenser and/or by passing the spent gas through a cooled gas-trap or a scrubbing liquid, so as to allow the volatile aldehyde to return to the reaction vessel or so as to recover it for a later batch.

The oxidation having been completed, the reaction liquid may be simply distilled, preferably in vacuo, and gives the pure fatty acid in substantially quantative yield, calculated on the amount of aldehyde entered into reaction. The catalyst which has been practically completely dissolved in the acid formed remains as residue of the distillation and, when suspended in fresh aldehyde, retains its efficiency for several batches.

The following examples illustrate how the invention may be carried out in practice, but it is to be understood that the invention is in no way limited to the details given in these examples.

EXAMPLE 1

*Oxidation of butyric aldehyde to butyric acid*

The catalyst consisted of a mixture of 37.2% Pb-, 34.7% Mn-, and 28.1% Co-oleates, obtained by heating the corresponding quantities of the respective carbonates with the calculated amount of oleic acid during 4 to 5 hours at about 120 to 130° C.

5.76 parts, i. e. 2% by weight, of catalyst were suspended in 288 parts of butyric aldehyde of B. P. 75° C., and a current of air passed through the vigorously stirred mixture. The progress of the reaction is indicated by the change in temperature as a function of time. The reaction vessel was neither heated nor coooled from the outside.

| Duration in minutes | Temperature in the liquid |
|---|---|
| | Degrees |
| 0 | 9 |
| 15 | 15 |
| 30 | 20 |
| 45 | 25 |
| 60 | 30 |
| 90 | 38 |
| 120 | 45 |

This temperature of 45° remained unchanged for further 6 hours. Then the temperature began to drop, indicating that the reaction neared completion.

Distillation of the reaction product gave:

B. P. 75°—10 parts butyric aldehyde=3.5%

B. P. 68°/19 mm.—220 parts butyric acid pure= 62.5%

A quantity of 95 parts butyric aldehyde=33.0% was recovered in the gas trap. Practically no loss of material had occurred.

The catalyst remaining as residue of the distillation was suspended in the same amount of fresh butyric aldehyde as above. An oxidation of 8 hours' duration, having the same temperature-time characteristics, yielded 13.9% butyric acid, B. P. 68°/19 mm.

and 13.0% butyric aldehyde, recovered in the gas trap.

The activity of the catalyst was, therefore, unimpaired.

EXAMPLE 2

*Oxidation of oenanthal to oenanthic acid (n-heptoic acid)*

3.6 parts, i. e. 2% by weight, of catalyst of the same composition as given above were suspended in 182.6 parts (1.6 mol) oenanthal of B. P. 155–157° C. and a current of air passed through the vigorously stirred mixture. While the vessel was neither heated nor cooled, externally, the temperature in the liquid rose from 10°

After 15 minutes to 18°
After 30 minutes to 21°
After 45 minutes to 28°
After 60 minutes to 33°
After 90 minutes to 35°
After 120 minutes to 39° are kept at this level for further 8 hours.

The distillation of the reaction liquid gave:

B. P. 42–43/10 mm., 45 parts unchanged oenanthal=24.6%

B. P. 115–116° mm., 155 parts pure oenanthic acid=74.5%

Practically no loss of aldehyde had occurred.

In the above examples, oleic acid was used as the unsaturated acid, for being used with the multivalent metals. Other unsaturated acids such as linoleic and linolenic could be used. Or the fatty acids of tall oil (which include these two plus abietic) would be suitable.

I claim:

1. A process of making a carboxylic acid which comprises mixing with an aldehyde to be oxidized, a catalyst containing an unsaturated fatty acid combined with a plurality of multivalent metals including lead, and intimately contacting a gas containing free oxygen therewith.

2. A process of making a carboxylic acid which comprises mixing with an aldehyde to be oxidized, a catalyst containing an unsaturated fatty acid combined with a metal selected from the group consisting of cobalt and manganese and a lead salt of an unsaturated fatty acid, and intimately contacting a gas containing free oxygen therewith.

3. A process of making a carboxylic acid which comprises mixing with an aliphatic aldehyde to be oxidized, a catalyst containing an unsaturated fatty acid combined with a plurality of multivalent metals and containing an unsaturated fatty acid combined with lead, and intimately contacting a gas containing free oxygen therewith.

4. Process as claimed in claim 1, in which the catalyst is used in finely divided particles, in suspension in said aldehyde.

5. A process which comprises the steps of heating together an unsaturated fatty acid with a plurality of basic compounds of multivalent metals including lead, until said acid and basic compounds combine with each other, and mixing the product produced with an aldehyde in a liquid condition.

6. A process as in claim 2, in which the amount of the catalyst is equal to about 0.5% to about 2% of the amount of said aldehyde.

7. A process as in claim 1 in which air enriched in oxygen is applied in the last step.

8. In the oxidation of aldehydes to acids, the step of mixing the catalyst as described in claim 1 with a small amount of the aldehyde and gently warming, and adding this mixture to the main bulk of aldehyde.

9. A process of forming fatty acids which comprises forming a mixture of an aliphatic aldehyde with a catalyst comprising a liquid unsaturated fatty acid chemically combined with a plurality of multivalent metals including lead, said catalyst being in a finely pulverulent condition, then passing air enriched with oxygen into intimate contact with such mixture of aldehyde and catalyst until the major part of the aldehyde has been converted into fatty acid, recovering aldehyde from the outgoing gaseous air-residue, and distilling the free fatty acid formed from the reaction product.

10. A process of oxidizing an aldehyde to a fatty acid which comprises passing a gaseous fluid containing free oxygen into contact with a mixture of such aldehyde with a catalyst which is a mixture of the manganese, cobalt and lead salts of an unsaturated aliphatic acid.

11. A process of oxidizing an aldehyde to a fatty acid which comprises passing a gaseous fluid containing free oxygen into contact with a mixture of such aldehyde with a catalyst which is a mixture of the manganese, cobalt and lead oleates.

CHARLES WEIZMANN.

(References on following page)

REFERENCES CITED

The following references are of record in the file of this patent:

UNITED STATES PATENTS

| Number | Name | Date |
|---|---|---|
| 2,005,134 | Flemming et al. | June 18, 1935 |
| 2,153,406 | Bauer | April 4, 1939 |
| 2,212,900 | Groll et al. | Aug. 27, 1940 |
| 2,341,339 | Staudinger et al. | Feb. 8, 1944 |
| 2,355,140 | Bludworth | Aug. 8, 1944 |
| 2,413,235 | Kennedy | Dec. 24, 1946 |

FOREIGN PATENTS

| Number | Country | Date |
|---|---|---|
| 550,134 | Great Britain | Dec. 24, 1942 |

OTHER REFERENCES

Yamada Jour. Soc. Chem. Ind., Japan, vol. 40, pp. 422B–424B (1937).

Chemical Abstracts, vol. 32, column 2815 (1937).